United States Patent
Kouhi

(10) Patent No.: US 9,215,575 B2
(45) Date of Patent: Dec. 15, 2015

(54) ENCODING AND DISTRIBUTION OF GAME PLAY THROUGH COMPACT MESSAGE ENCODING AND GRAPHICAL RENDERING

(76) Inventor: Ross George Kouhi, Ottawa (CA)

(*) Notice: Subject to any disclaimer, the term of this patent is extended or adjusted under 35 U.S.C. 154(b) by 1905 days.

(21) Appl. No.: 12/469,217

(22) Filed: May 20, 2009

(65) Prior Publication Data

US 2010/0298055 A1    Nov. 25, 2010

(51) Int. Cl.
*H04W 4/20* (2009.01)
*H04L 29/06* (2006.01)

(52) U.S. Cl.
CPC ............... *H04W 4/206* (2013.01); *H04L 67/38* (2013.01)

(58) Field of Classification Search
CPC ................................ H04W 4/206; H04L 67/38
See application file for complete search history.

(56) References Cited

U.S. PATENT DOCUMENTS

| | | | |
|---|---|---|---|
| 5,557,717 A | 9/1996 | Wayner | |
| 5,652,573 A | 7/1997 | Maul et al. | |
| 5,738,583 A | 4/1998 | Comas et al. | |
| 5,846,132 A | 12/1998 | Junkin | |
| 6,122,559 A | 9/2000 | Bohn | |
| 6,183,367 B1 | 2/2001 | Kaji et al. | |
| 6,240,415 B1 | 5/2001 | Blumberg | |
| 6,383,075 B1 | 5/2002 | Jeong et al. | |
| 6,884,171 B2 | 4/2005 | Eck et al. | |
| 6,976,031 B1 | 12/2005 | Toupal et al. | |
| 6,993,509 B2 | 1/2006 | Vidich et al. | |
| 7,037,198 B2 | 5/2006 | Hameen-Anttila | |
| 7,142,933 B1 | 11/2006 | Puma et al. | |
| 7,206,766 B2 | 4/2007 | Vidich et al. | |
| 7,338,376 B2 | 3/2008 | Eck et al. | |
| 7,347,780 B1 | 3/2008 | Best | |
| 7,660,864 B2 * | 2/2010 | Markki et al. | 709/207 |
| 2009/0093300 A1 * | 4/2009 | Lutnick et al. | 463/26 |
| 2009/0233707 A1 * | 9/2009 | Kammler | 463/27 |

* cited by examiner

*Primary Examiner* — William Coleman
(74) *Attorney, Agent, or Firm* — Marks & Clerk; S. Mark Budd

(57) ABSTRACT

A game play encoding and delivery method and means are provided, having encoding elements which create simple messages to represent movements and features of a sports game or other competition. Streams of such game activity messages are delivered to viewers who watch the game action as rendered into a simple graphical presentations. The system is particularly useful for overcoming the lack of availability of sports event viewing in certain non-traditional viewing situations or in situations where viewer attention is divided.

23 Claims, 10 Drawing Sheets

```
<event type = "1">
  <d>2005-11-03</d>
  <t>13:33:28</t>
</event>
```
142

```
<event type = "5">
  <sponsor>advertiser account 1230000456</sponsor> <adimg
  dura="5000">ad_sml.gif</adimg>
  <adlink>adcompany.net</adlink>
</event>
```
144

```
<event type="3">
  <t>26.68</t>
  <x>241</x><y>92</y>
</event>
```
148

FIG. 3

ENCODING AND DISTRIBUTION OF GAME PLAY THROUGH COMPACT MESSAGE ENCODING AND GRAPHICAL RENDERING

FIELD OF THE INVENTION

The invention relates to capturing an activity such as competitive game play information and sharing it with an audience over a network, in particular the encoding technique, information representation, and distribution system architecture that enables efficient, broadly available dissemination of such information to end users.

BACKGROUND OF THE INVENTION

Sports events, games and other competitions draw enthusiasts who are interested in following the progress of such events, as is evidenced by large in-person attendance numbers, lucrative television and radio broadcasts, and diverse information sharing media which exist for the enjoyment of fans and casual followers.

Typical access methods provided include live attendance, television or radio broadcasts, emerging internet video streaming technology, and post-event highlights and summary presentations in newspapers.

Between the presentation of live audio and video media and the post-event information summaries there is currently no means to communicate move-by-move game play progress in a distilled, graphical format. Such a distillation would offer spectators an ability to follow game play progress without the associated extra visual information or 'clutter' which commands full attention engagement. Such a "lightly-engaging" game information presentation is of value where a person has the need, or desire, to dedicate a portion of their attention to something else, such as workplace tasks, the public-space environment around them, or to other people with whom they may be interacting.

Conventional media delivery of game events does not accommodate viewers in diverse environments. Television programs, for example, are most comfortable for users to watch in a residential environment, or in a group viewing environment such as a public bar or club. In such cases, the immersion of the viewers attention in the event is comfortable and enjoyable. Self immersion is not desirable in other environs where the domination of viewer attention is detrimental to personal feelings of comfort, safety, engagement with others, task-effectiveness or general awareness. Examples are the work environment, where certain tasks and goals must be addressed, or in a public transit situation where commuters are most comfortable when they can maintain an awareness of the people and space around them or pending connections required to complete their trip.

As well, in an era when time is perceived as a highly valued resource, individuals engage in a high degree of multi-tasking. Thus being able accommodate interest in following a game event while also addressing other interests, tasks or chores is of value to people.

A typical approach for individuals with an interest in a sports event who find themselves otherwise engaged or committed is to seek out small bits of information during the event, such as asking others "do you know what the score is in the game?" They may also repeatedly check a website for score and progress updates. They are also likely to check other diverse media for reports of the game outcome due to their inability to have followed the event.

No broadly available, or even cursorily available means to deliver a low-engagement sports event progress appears to be available to consumers of such information. As well, there is usually no means by which a game joined in progress can be seen in its entirety, or a game just missed can be seen at all.

A means for effectively capturing and sharing game play information in a way that is conducive to such a situation is therefore needed to fill the niche of low-density sports information delivery.

SUMMARY OF THE INVENTION

In accordance with one aspect of the invention, a method of generating a game play file describing an event is provided. Aspects of the event are captured using a graphic user interface. Game activity messages are generated, each of which describes one of the captured aspects of the event. The game activity messages are assembled into a game play file. The position of an element of the event may be determined from the position of a cursor, and one of the game activity messages include this position. Additional game activity messages may be included in the game play file as embellishments, such as advertisements, indications that a video clip of a portion of the event is available, or indications that an important play is imminent.

In accordance with another aspect of the invention, a method by which an end user device displays game play information is provided. An event is identified to a server. Game activity messages for the event are retrieved from the server, at least some of the game activity messages including a position, a timestamp, and an identification of an element. A representation of a field of play is displayed, along with at least one icon, each icon representing a different element. The at least one icon is moved on the representation of the field of play in accordance with the game activity messages. Movement of the at least one icon may represent a compressed game in that the time between display of two icons representing the same element is reduced from the time between the timestamps of two sequential game activity messages identifying that element. Additional game activity messages may be included in the game play file as embellishments, such as advertisements, indications that a video clip of a portion of the event is available, or indications that an important play is imminent.

The methods of the invention may be stored as processing instructions on computer-readable storage media.

This invention provides a method for the encoding of game play information from live and archived events, and for effectively delivering such information to interested consumers. The invention includes the ability to compress playback information by reducing the chronological delay between actions to allow catch-up viewing. Compressing of playback can also make historical game viewing more attractive.

The method of this invention also provides the means by which advertisement delivery can be efficiently incorporated into the architecture to convey business value to an operator of such a distribution network.

In addition, the invention enables owners of previously archived sports event broadcasts to encode and distribute those events in a compressed and broadly accessible offering. In this way, the invention brings economic value to assets which are otherwise not typically able to generate revenue for their owners.

In addition, the invention enables consumers to access an occasional full-video replay of a particularly exciting or interesting portion of the game action when such an event occurs. Thus, the viewer can choose to briefly engage with the presentation at a higher level for a short time if they feel comfortable doing so in their environment at that moment.

BRIEF DESCRIPTION OF THE DRAWINGS

The features and advantages of the invention will become more apparent from the following detailed description of the preferred embodiment(s) with reference to the attached figures, wherein:

FIG. 3 shows example structures of GAMs generated by the GPE of FIG. 1 according to one embodiment of the invention;

It will be noted that in the attached figures, like features bear similar labels.

DETAILED DESCRIPTION OF THE EMBODIMENTS

Figure 1:
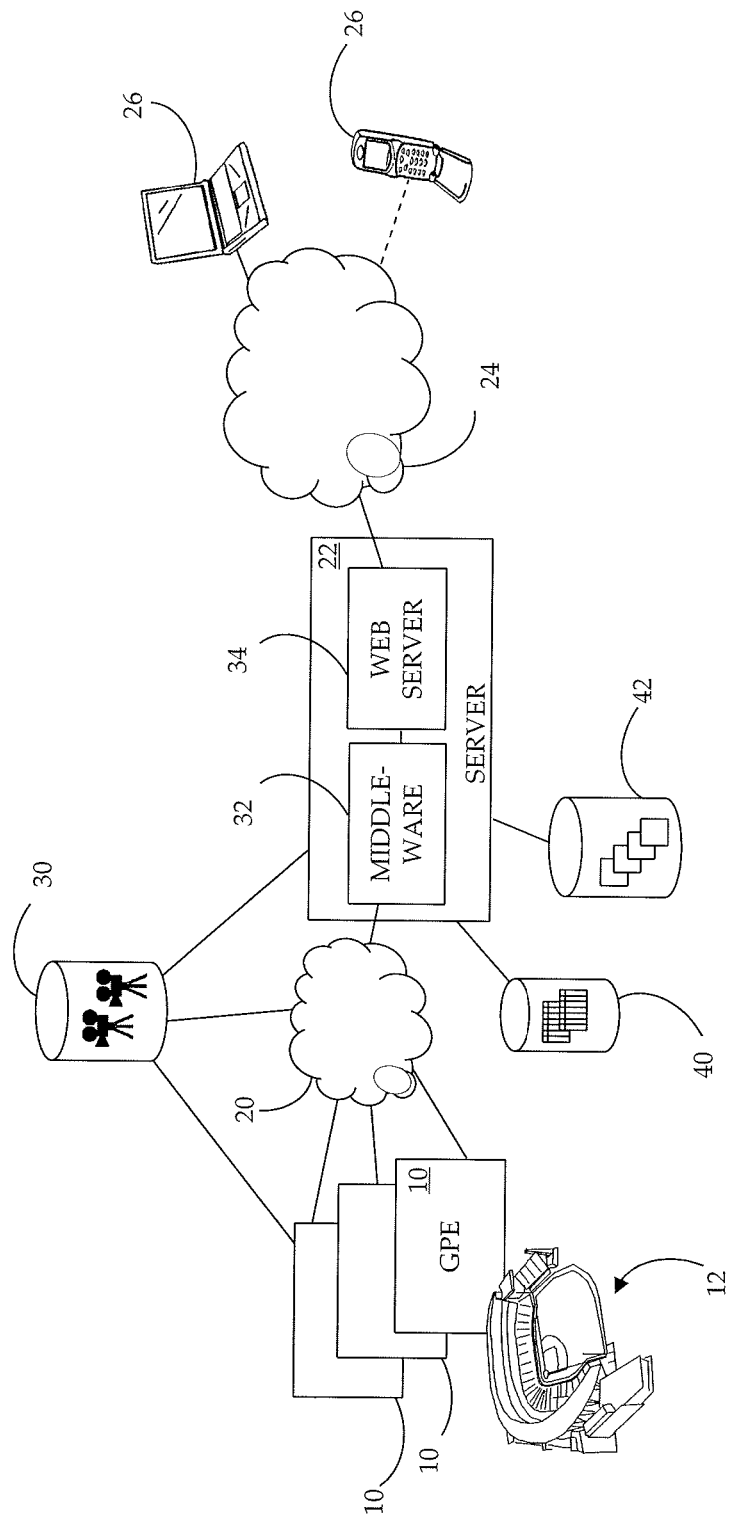
FIG. 1 is a portion of a game playing environment and of a network according to one embodiment of the invention.

Referring to FIG. 1, a portion of a game playing environment and of a network according to one embodiment of the invention are shown. At least one Game Playing Encoder (GPE) 10 is in communication with a site of a live sports event 12, archived events such as non-live games, or both. The GPEs communicate through a first network 20 with a server 22. The server 22 communicates through a second network 24 with at least one end user device 26. The first network 20 and the second network 24 may be the same network. The networks 20 and 24 are conventional packet data networks and may consist of an Internet Protocol (IP) wide area network, on which all the entities are able to send and receive Transmission Control Protocol (TCP) packets over IP. Similarly, either or both networks 20 and 24 could be a local area network such as an IEEE 802.3 Ethernet, or a wireless network under a common protocol such as IEEE 802.11n or another standard.

It should be noted that three GPEs 10 and two end user devices 26 are shown in FIG. 1. In general, there is at least one GPE 10 and at least one end user device 26 in communication with the server 22.

The end user devices 26 comprise any portable device on which a simple graphical display can be presented. Examples include a laptop computer and a smart phone.

The server 22 is in communication with a video replay repository 30 which stores video replay data. The video replay repository 30 may be also accessible by one or more of the GPEs 10. The operation of the GPEs 10 in relation to a live sports event 12 or an archived event stored in the video replay repository 30 will be described below.

The server 22 consists of a middleware component 32 and a web server component 34. The middleware component 32 is able to receive signals from the GPEs 10, to store details of particular games in a games database 40, to store encoded game information in a game repository 42, and access video replay data from the video replay repository 30. The web server component 34 allows communication with the end users 26 through the second network 24, and is also in communication with the middleware component 32.

Figure 2:
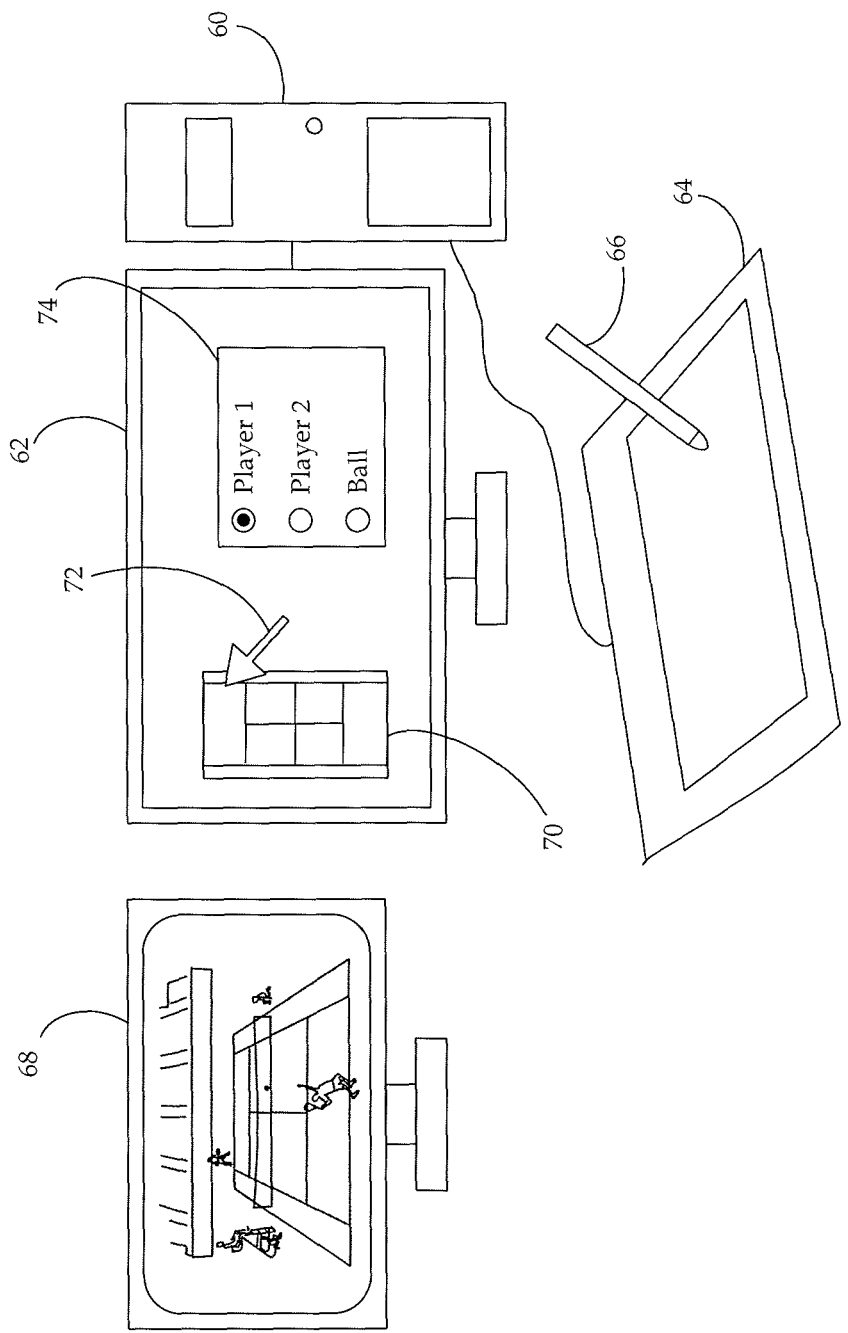
FIG. 2 is a diagram of equipment by which an operator of a GPE of FIG. 1 captures game play information according to one embodiment of the invention.

The operation of the GPEs 10 will now be described. Each GPE 10 is located at the site of a live sports event, or has access to an archived game. It should be noted that a GPE 10 may have access to both a live sports event and archived games, but in operation this would rarely provide an advantage. A GPE 10 may alternatively have a video access to the live sports event. Each GPE 10 is an apparatus comprising a software application on a computer platform with a graphical user interface. An operator uses the graphical user interface to encode movement that he or she observes during a game (or other event) into movement records. The observations may be of a live sports event 12, in which case the GPE 10 is located at the live sports event 12 or has video access to the live sports event 12. The observations may alternatively be of an archived game, in which case the GPE 10 may be located anywhere in communication with the archived game, such as at an office building. Referring to FIG. 2, a diagram of equipment by which an operator of a GPE 10 captures game play information according to one embodiment of the invention is shown. The equipment of the GPE 10 includes a computer 60 connected to a video monitor 62 and a pointing apparatus, such as a tablet 64 and stylus 66. The tablet and stylus may also be replaced by a conventional computer mouse. The operator has access to a source of video information on a television 68 that depicts an entire event, such as a sports game, or alternatively the operator may have a direct view of a live event. The video information may alternatively present an archived event.

The GPE 10 also includes a software application program controlled by the computer 60 and which presents a user interface on the monitor 62 which includes elements such as a graphical representation of the field-of-play 70, a pointing cursor 72, and a function selector element 74. The operator is able to see the presentation of the event and choose an element that will be captured and encoded, and indicate this choice on the function selector 74. The element is typically a play object, such as a ball, or a player. It is possible that there be multiple play objects from which a selection can be made, and likely that there are multiple players from which a selection can be made. The operator may even switch play objects if there are multiple play objects and there is sufficient time, as in a chess match. This choice is recognized by the software application program of the GPE 10. Then, visually estimating the position on the field of play graphic 70, the operator may move the cursor about with corresponding movements of the stylus 66 upon the tablet 64. The movements of the cursor will ideally mirror the play being presented from the game, and in any event the movements of the cursor are encoded by the software application program of the GPE 10 into GAMs which record the position of the identified element as a function of the position of the cursor on the graphical user interface, possibly relative to the displayed field of play 70. The GAMs are delivered to the server 22 from whence they are made available to viewers. In this way, GAMs representing movements within a game are encoded and transmitted to the server 22.

The encoding method includes a means to selectively discard points to achieve a density of positional information as necessary to convey a fluid motion while avoiding excessive data transmission in the form of GAMs. Thus, a thousand points to convey the movement of a ball across a tennis court may be excessive, while two points may be too few.

Alternatively the video information regarding the sports event may also be displayed and controlled in a computer application window resident on the same computer display 62, and the windows on that monitor may be arranged in a manner to allow the operator to see that video information while operating the digitization functions that encode the movements.

In some scenarios, such as described below with reference to FIG. 5, the sport being captured requires many duplicates of the apparatus on which individual operators each select a different function through their respective selectors 74, and thus provide the stream of GAM data to a consolidation and aggregation function.

In some embodiments a precisely positioned camera may provide a video feed which may be embedded into the software application program so that the operator may align the boundaries of the field of play with an overlay of the graphical field of play representation. With a suitably aligned overlay, the operator may use the pointing apparatus to follow a moving element such as a player or ball around the screen directly, rather that estimating the position on the field of play graphic.

In some embodiments computer vision software such as is known in the art may be employed to recognize and track the movements and provide data which corresponds to the positions of game elements. The apparatus illustrated in FIG. 2 may receive such data and similarly encode and forward the resulting GAMs to a GPE director. The computer vision technology is outside the scope of this invention.

In some embodiments players in the game may wear physical position tracking apparatus such as is known in the art, to provide data telemetry that describes their position. Such data may similarly be received by the software program for conversion into GAM streams for handling as described earlier. The tracking apparatus that may be affixed to players or play-objects is outside the scope of this invention.

Each GPE 10 sends out signals as game activity messages (GAMs). Each GAM may comprise motion and position descriptions, including time stamps and some spatial information in brief references. The spatial information may be in any format, such as a position within a Cartesian grid or a vector representation of movement. In general, each GAM generated by a GPE 10 contains information that can be stored in an XML (eXtensible Markup Language) file. The GAMs may be transmitted in any format, such as binary or text, as long as they can be understood and re-transmitted by the operator of a GPE director 80 apparatus, and understood and stored by the server 22. A GAM refers to a message relating to a game, advertisement, or other feature, as is used in the stream of GAMs generated by the operator of a GPE 10, selected by the operator of the GPE directory 80, or stored in the game repository 42 as part of a game play file. When stored as part of the game play file, each GAM is an XML element within the game play file.

Referring to FIG. 3, the structure of various stored GAMs according to one embodiment of the invention is shown. Each GAM begins with a type indication. The first GAM 142 has a type indication indicating that the GAM is a start message. The subsequent fields indicate a date and time at where in the flow of game events this particular GAM should be positioned relative to other GAMs in a browser.

A second GAM 144 has a type indication that the GAM relates to an advertisement. The subsequent fields indicate information about the advertisement. A third GAM 148 has a type indication indicating that the GAM is a ball movement message. Subsequent fields show a time and Cartesian x-axis and y-axis coordinates, which provide a position indication of the ball. A series of simple messages in which the GAM is indicated as being a ball movement message indicate positioning information of the ball. A series of GAMs such as those shown if FIG. 3, as many others that follow a similar structure, may comprise a full game.

This is not an exhaustive list of GAMs, nor are the examples given necessary, as the GAMs are stored as customized XML. Rather the GAMs described above with reference to FIG. 3 merely represents three examples of stored GAMs. The particular fields and values shown in FIG. 3 can also be altered, as XML is highly customizable. Broadly, the GAMs are simple text messages that contain game related information or advertisements.

Figure 4:
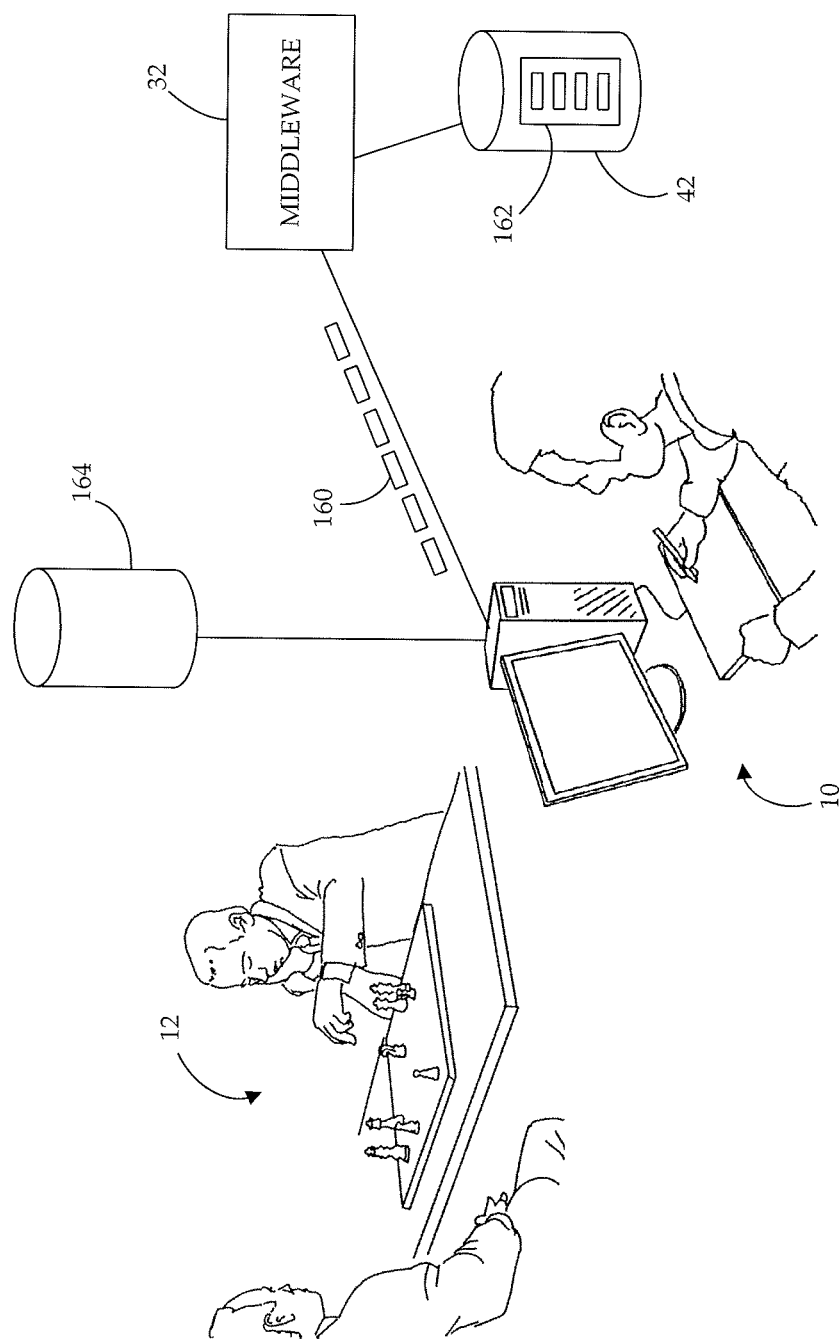
FIG. 4 is a portion of a game playing encoder (GPE) of FIG. 1 according to one embodiment of the invention.

Referring to FIG. 4, an example of operations by a single GPE operator observing a live game according to one embodiment of the invention is shown. Such an embodiment represents perhaps the simplest generation of GAMs and an associated game file, and is best used for a game in which there is only one object that moves significantly at one time, such as a chess game or a golf game. An operator of a GPE 10 observes the live game 12 and operates the GPE 10 as described above with reference to FIG. 2. A series 160 of GAMs are generated by the GPE 10 and transmitted to the middleware 32. The middleware 32 creates a game file 162 that is stored in the game repository 42 out of the GAMs 160 sent from the GPE 10. The GAMs 160 include at least a start GAM and an end GAM, as well as GAMs that track the motion of an object within the live game 12. The game file 162 may be created and enlarged as the GAMs 160 are received by the middleware 32, or the middleware 32 may collect all the GAMs before generating the game file 162 and inserting all the GAMs.

After, before, or during the game, the operator of the GPE 10 may act as a director, and add embellishments to the GAMs. The embellishments may take the form of advertisements, play highlights, imminent important plays, or any other information that can be represented by a GAM. If for example an advertisement is to be inserted into the game file 162, the operator of the GPE 10 may generate a GAM pointing to an advertisement in a feature repository 164. The feature repository 164 is not shown in FIG. 1 because it is optional. As another example, if a play is to be highlighted for actual viewing by an end user, the operator of the GPE 10 may generate a GAM indicating that a play highlight is available by selecting a button (not shown in FIG. 2) in the graphic interface 62 of the GPE 10. A video clip of the previous 15 seconds (for example) of play are stored in the video repository 30, and the GAM generated by the GPE 10 points to the video clip. As yet another example, if an imminent important play is coming up, such as a match point of a tennis game, the operator of the GPE 10 may generate a GAM indicating that the important play is coming up. Such a GAM may be interpreted by an end user device to alert an end user to the upcoming important play, such as by changing the colour of the screen or of the representation of the playing field.

Figure 5:
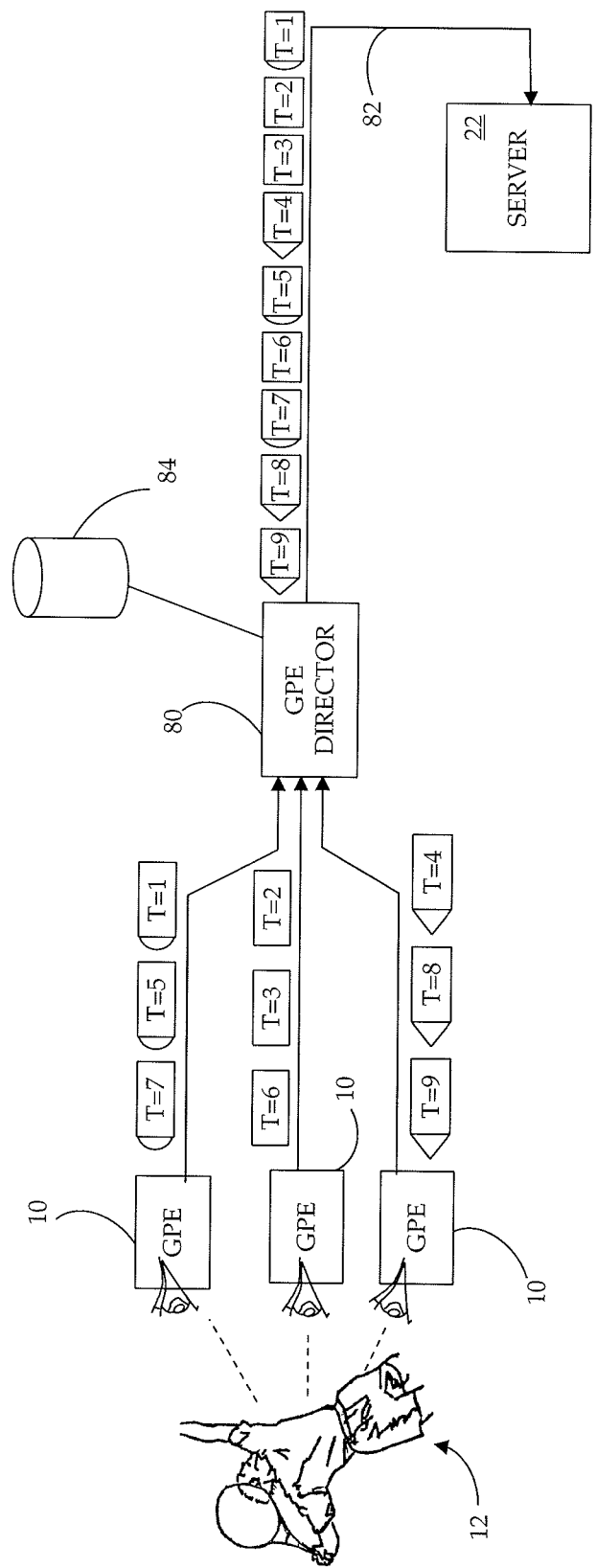
FIG. 5 is a portion of several GPEs according to another embodiment of the invention.

Referring to FIG. 5, an example set of simultaneous operations by multiple operators observing a live game according to one embodiment of the invention is shown. In this example, the live sports event 12 is observed by three operators of three respective GPEs 10, although more generally there will be any number of operators and respective GPEs 10, including only one. Each operator observes the live sports event 12. However each operator has a different perspective of the live sports event 12, such as a different angle of view of the live sports event 12 or a different target of interest (such as one of the players or the ball). Each operator summarizes in the respective GPE 10 the position and movement of their respective aspect of the game using for example the equipment and method described above with reference to FIG. 2, and the GPEs 10 generate and send GAMs to a GPE director 80. The GPE director 80 operates similar apparatus as make up the individual GPEs, though strictly a GUI is unnecessary. The GPE director 80 arranges chronologically the GAMs received from the individual GPEs, and transmits the arranged GAMs as a GAM stream 82 to the server 22. The GPE director 80 may also insert advertisements and/or additional features into the GAM stream 82 as extra GAMs, having obtained the advertisements and/or additional features from a feature repository 84 as appropriate for the desired presentation. It should be noted that the GPE director 80 and feature repository 84 of FIG. 5 are not shown explicitly in FIG. 1, since they are optional and in any event form part of the GPEs 10 of FIG. 1, if present.

At any point the GPE director 80 may also issue a GAM which indicates when a particularly interesting segment of play has occurred by having the GAM point to a corresponding video clip of the play captured in the video replay repository 30. The GPE director 80 may generate the GAM and corresponding stored video clip. Alternatively, or additionally, one of the operators of the individual GPEs 10 may indicate the video clip using a widget on the user interface 62, indicating that the last 15 seconds (for example) are to be stored and highlighted. A GAM pointing to the video clip is generated by the individual GPE 10 is sent to the GPE director 80, and the GPE director 80 either ignores the GAM or incorporates the GAM into the GAM stream 82 sent to the server 22. The GAM may also include any of the duration, the type of highlight, and the time of start or end of the highlight within the game.

The GPE director 80 may be located anywhere in communication with the GPEs 10 and the server 22. The GPE director 80 may be collocated with the GPEs 10, may be collocated with the server 22, or may be remotely connected to both over a network.

Figure 6:
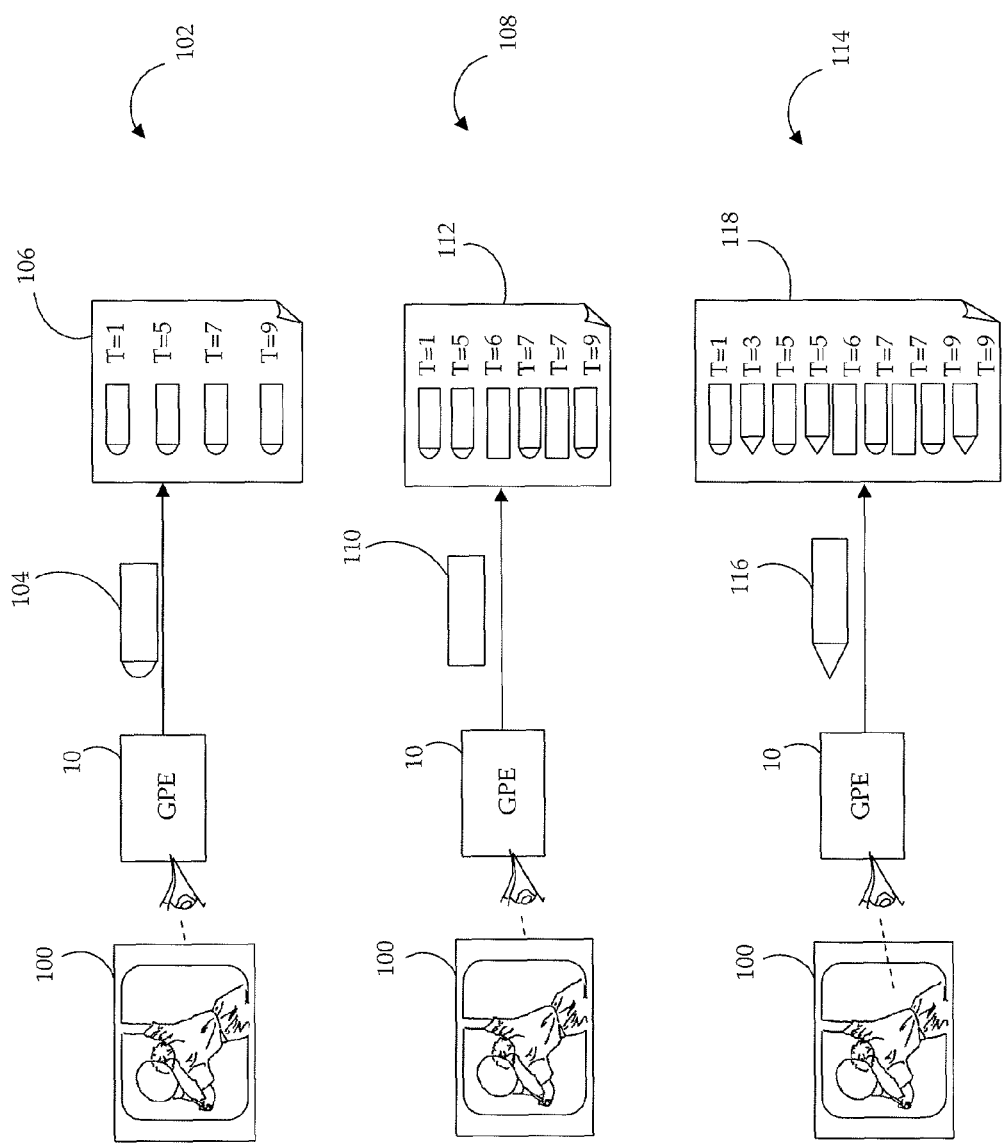
FIG. 6 is a GPE and a game file according to yet another embodiment of the invention.

Referring to FIG. 6, an example chronological sequence of operations by a single operator observing an archived game according to one embodiment of the invention is shown. The operator may view the archived game by operating a video replay 100 of the game, for example. During a first pass 102, an operator of a GPE 10 may select the movement of a single player, capturing the movement of that player about the field of play. The movements are captured as a series of GAMs 104 generated by the GPE 10, and each GAM is captured in a game play file 106. The game play file 106 may be of any suitable nature wherein the GAMs 104 are recorded, such as a binary file, a text file containing XML formatted content, or a table in a database.

During a second pass 108, the operator of the GPE 10 selects a different perspective of the archived game, such as a tennis ball's position on the court. The operator generates a second series of GAMs 110 using the GPE 10, and the game play file 106 is updated with the new GAMs 110. The new GAMs 110 are interleaved with the existing GAMs and both perspectives of the archived game are encoded in chronological order within the modified game play file 112. If two of the GAMs have the same time data, they may be arbitrarily placed in the modified game play file 112 relative to one another.

Similarly, during a third pass 114, the operator of the GPE 10 selects a different perspective of the archived game, such as the movement of a second player. The operator generates a third series of GAMs 116 using the GPE 10, and the game play file 112 is further updated with the new GAMs 116. The new GAMs 116 are interleaved with the existing GAMs and all three perspectives of the archived game are encoded in chronological order within the modified game play file 118. Thus with successive passes the total action of the game may be captured.

The operator of the GPE 10 may also act as a GPE director by inserting embellishing GAMs into the game play file at any point, though preferably after all the game GAMs have been added and the game play file 118 represents all desired perspectives of the game. Examples of embellishing GAMs are advertisement GAMs and highlight GAMs, the former pointing to advertisements stored within a feature repository, the latter pointing to video clips selected by the operator and stored in the video repository 30.

It should be clear that more than one operator can be used in multiple passes of an archived event, and that the sporting event may be a combination of live action and recorded. For example, more than one operator may generate streams of GAMs for interleaving in a game play file. Alternatively, at least one stream of GAMs may be generated by one or more operators watching a live sporting event, and then additional GAMs can be generated later (either after the game has ended or while the game is still in progress) by one or more operators from a recorded version of the game. All the GAMs are ultimately interleaved within a game play file. The game play file may be manipulated by a GPE director 80, as described above with reference to FIG. 5, and the resulting game play file stored in the game repository 42.

Figure 7:
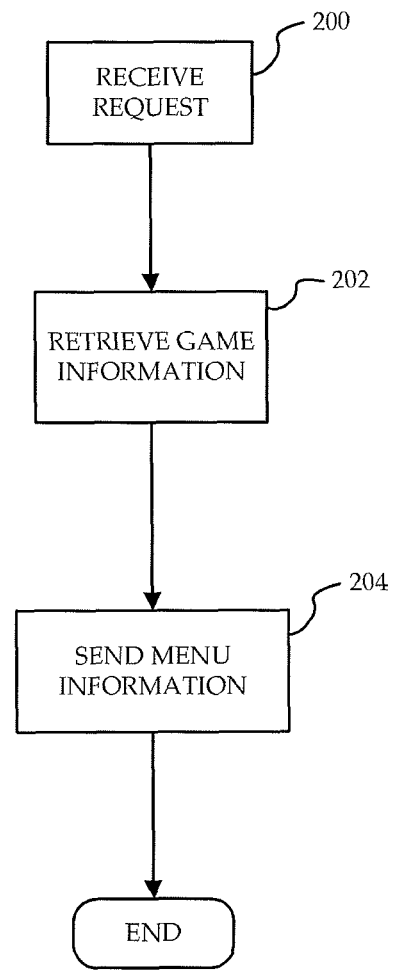
FIG. 7 is a flowchart of a method carried out by the web server of FIG. 1 according to one embodiment of the invention.

The operation of the web server 34 will now be explained. Broadly, when the web server 34 receives a request for a menu, the web server 34 determines from the game repository 42 the games for which the web server 34 can provide GAMs. The web server then provides information which allows selection of a game. When the web server 34 receives an identity of a game, the web server 34 accesses the game repository 42 to retrieve the game file corresponding to the game from the game repository 42. Referring to FIG. 7, a flowchart of a method by which the web server 34 responds to a request for game information according to one embodiment of the invention is shown. At step 200 the web server 34 receives a request for game information. At step 202 the web server 34 consults the game repository 42 to determine the identification of games for which the game repository 42 stores game files or partial game files if the game is not yet complete. At step 204 the web server 34 sends the identification of the games to the source of the request for game information.

Figure 8:
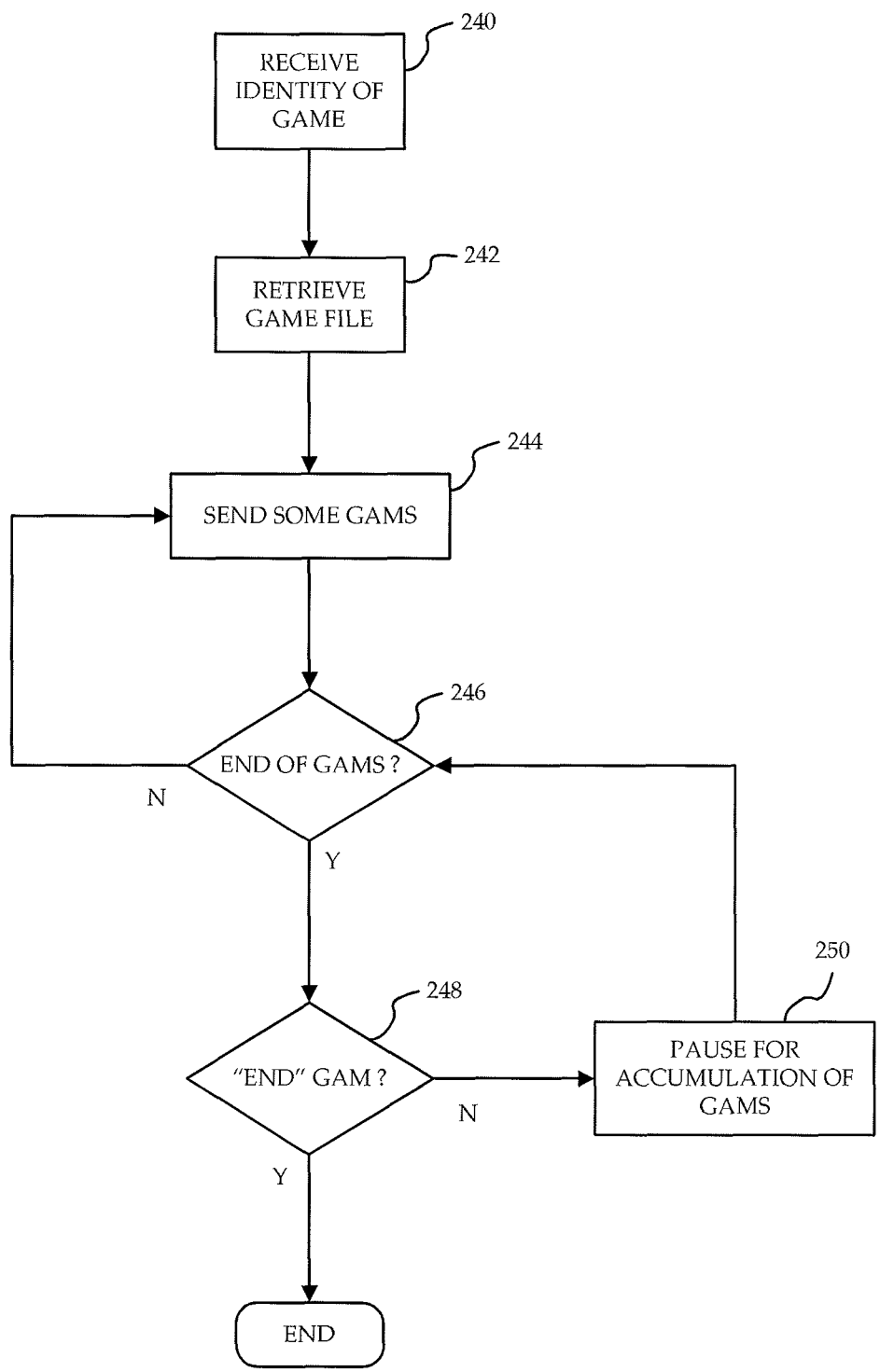
FIG. 8 is a flowchart of another method carried out by the web server of FIG. 1 according to one embodiment of the invention.

Referring to FIG. 8, a flowchart of a method by which the web server 34 responds to an identification of a game according to one embodiment of the invention is shown. At step 240 the web server 34 receives the identity of a game. At step 242 the web server 34 retrieves the game file associated with the identified game from the game repository 42. A game file will always exist, since the web server 34 can only receive the identification of a game from information provided by the web server 34 itself, and such information is generated from the information in the game repository 42. At step 244 the web server 34 sends at least one GAM stored in the game file to the source of the game identification received at step 240. The number of GAMs to be sent strikes a balance. If too few GAMs are sent at one time, then the packet in which the GAM or GAMs will be dominated by header information and the transmission of GAMs as the payload will be inefficient. If too many GAMs are sent at one time, then latency in the display of the game as the end user device 26 waits for a large bundle of GAMs to arrive. The number of GAMs to be sent can also be dynamically adjusted in some embodiments, to suit current network congestion.

At step 246 the web server 34 determines if there are any more GAMs in the game file representing the game for which an identification was received at step 240. If there are additional GAMs, then at least one of these is sent at step 244. If there are no more GAMs to send then it is possible that the web server 34 has sent all the GAMs within the game file. At step 248 the web server 34 determines if an "end" GAM has been sent. If not, then the game file from which the web server 34 is retrieving the GAMs is not yet complete, most likely due to the game identified at step 240 being a live game. The web server 34 pauses at step 250 to allow new GAMs to be generated and concatenated to the game file. The duration of the pause is configurable in terms of time or number of GAMs, but may also be dynamic. Once the web server 34 has paused, the web server determines at step 246 again whether the game file contains any more GAMs, in this case newly received GAMs. If so, then the web server 34 transmits the GAMs at step 244. The web server 34 may be configured to give up after a certain number of tries.

If the web server 34 determines at step 248 that an "end" GAM has been sent, then the web server 34 has sent all GAMs relating to this game.

Figure 9:
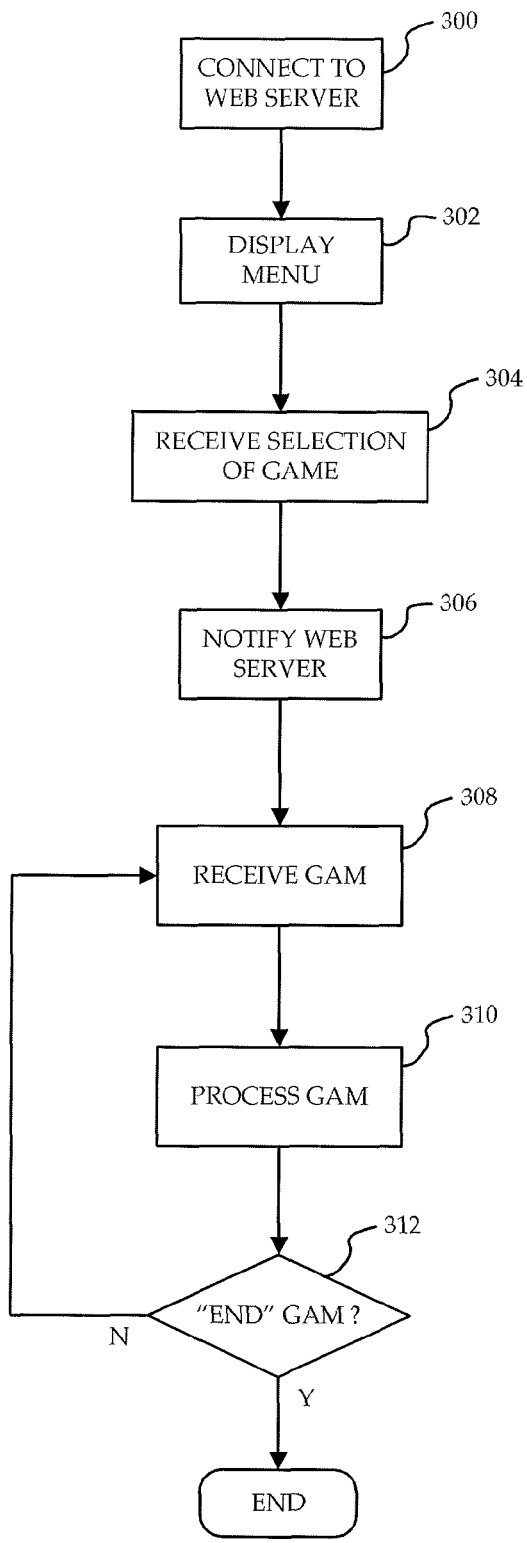
FIG. 9 is a flowchart of a method carried out by an end user of FIG. 1 according to one embodiment of the invention.

The operation of an end user device 26 will now be explained. Broadly, the end user device 26 receives a series of GAMs, preferably within the payload of TCP packets, and displays a game in a simple graphical format using the GAMs. The end user device 26 may also display advertisements or highlight a video clip retrieval button to indicate availability of a replay clip, depending on the nature of any individual GAM. Referring to FIG. 9, a flowchart of a method carried out by an end user device 26 when a game is to be displayed according to one embodiment of the invention is shown. The method is carried out by an end user device, although with interaction with a human user. At step 300 the end user device 26 accesses the web server 34. At step 302 the end user device 26 displays a menu, which may include sub-menus. The menu and optionally sub-menus may contain any of game types, game venues, game series, identities of individual games, and identities of players, as examples only. The menu may be generated by the end user device 26 from information provided by the web server 34. From the menu and optionally sub-menus, the user selects a game for viewing and at step 304 the end user device 26 receives the selection of a game. The end user 26 notifies the web server 34 of the game selection at step 306.

At step 308 the end user device 26 receives at least one GAM from the web server 34. The GAM is preferably in the form of part of the payload of a TCP packet. It should be noted that more than one GAM may be received at one time, and GAMs may be spread over several packets. At step 310 the end user device 26 processes the GAM. The type of processing will usually depend on the type of GAM being processed. Most GAMs will be game GAMs, in that they will specify the position of players or of a play object such as a ball. Other GAMs may indicate the type of game, the identities of players, advertisements, the start of a game including the time and date, the opportunity to view actual video replay of a highlight, the end of a game, or the end of a game file, as examples. At step 312 the end user device 26 determines whether the GAM indicates the end of a game file. If the GAM does not indicate the end of a game file, then the end user device 26 receives and processes another GAM.

Figure 10:
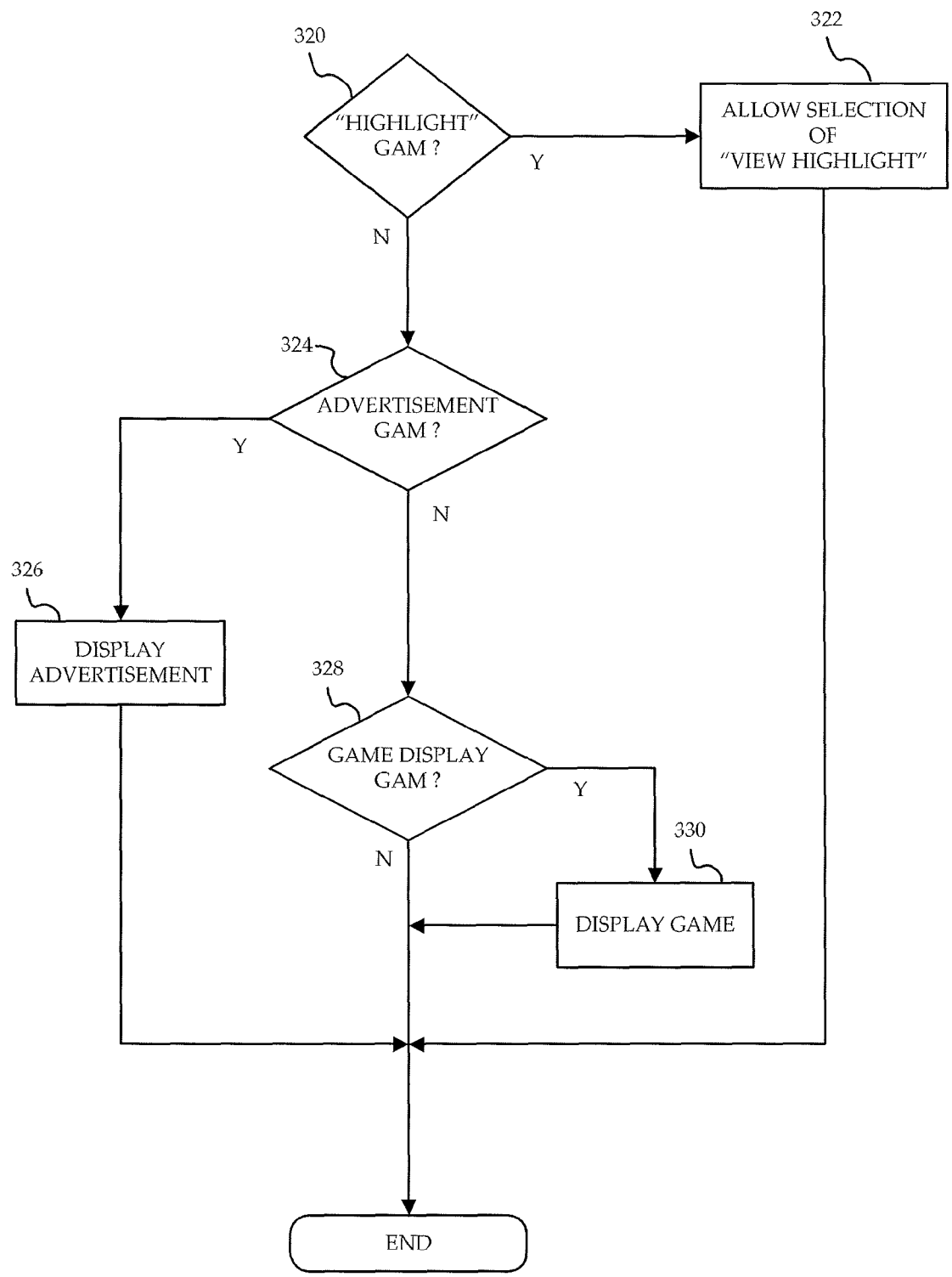
FIG. 10 is an example flowchart of the GAM processing of FIG. 8 according to one embodiment of the invention.

Referring to FIG. 10, an example flowchart of the GAM processing of FIG. 9 according to one embodiment of the invention is shown. The flowchart shows one example expansion of the step described above as step 310. At step 320 the end user device 26 determines whether the GAM being processed is a "highlight" GAM, in other words whether the type indication of the GAM indicates that the GAM identifies a video clip which can be viewed. If so, then at step 322 the end user device 26 allows selection of a View Highlight button, such as by displaying an otherwise invisible button alongside the simple graphical display of the game, or such as by making an otherwise visible button clickable. The duration for which a View Highlight button is visible and clickable is indicated in the GAM. Following this period of visibility, the highlight link contained in the GAM may be appended to a list of available highlights from the game. The user may elect to view any of these highlight replays after the fact at the user's leisure.

If end user device 26 determines at step 320 that the GAM is not a "highlight" GAM, then at step 324 the end user device 26 determines whether the GAM being processed is an advertisement GAM, in other words whether the type indication of the GAM indicates that the GAM identifies an advertisement. If so, then at step 326 the end user device 26 displays the advertisement included in, referred to by, or pointed to by the GAM. The advertisement may be displayed in any form, such as a static display of a graphic alongside the display of the game play for a duration indicated by the GAM, or a video clip before or during display of the game play indicating that the game or a portion of the game is provided benefit of an identified sponsor.

If the end user device 26 determines at step 324 that the GAM is not an advertisement GAM, then at step 328 the end user device 26 determines whether the GAM being processed in a game display GAM, in other words whether the type indication of the GAM indicates that the GAM identifies a position of a player or of a game object. If so, then at step 330 the end user device 26 displays an icon representing the player or game object identified by the GAM at the position identified by the GAM with reference to a graphic representation of the game play area displayed on the end user device 26, and any previous displayed icon. In this way, movement of the object and optionally the players may be represented by movement of the icon or icons in accordance with the positions and times indicated in the GAMs. The end user device 26 thereby displays a simple representation of the game. In some embodiments the movement of a game object from a first position to a second position may be rendered not by movement of an icon on the display of the end user device 26, but instead by a vector that indicates the path of the game object. With subsequent game display GAM messages, the previous vector may disappear, or the last two or more may be retained for a designated amount of time, creating a briefly persistent view of the movements. This may be of particular value when movements of the game object are rapid and otherwise hard for a viewer to follow.

The display of the icon or icons which represent the object and optionally players at different times may reflect the time stamps within game display GAMs. In other words the time between display of two icons representing the same player or object may be the same as the time between the time stamps of two sequential game display GAMs for that player or object. Alternatively, if the game is an archived game, the end user device 26 may display a portion of the game or the entire game in a compressed format. In such an embodiment, the time between display of two icons representing the same player or object is reduced from the time between the time stamps of two sequential game display GAMs for that player or object.

If the end user device 26 determines at step 328 that the GAM is not a game display GAM, then the GAM is of an unknown type and is ignored. Of course, there may be many more types of GAM recognized by the type indication of the GAM and processed by the end user device 26. For example, a GAM may be a start GAM that identifies the game and game type, and processing of the GAM involves displaying the identification of the game, displaying a simple graphic representation of the game play area, and establishing a coordinate system in which subsequent player and game objects are positioned and displayed. The GAM processing described above with reference to FIG. 10 presents a few examples of GAM types, and is not intended to be exhaustive.

Methods which are equivalent to those described above with reference to FIG. 7 to FIG. 10 may be used, and numerous alternatives are possible. For example, the end user device 26 may make the decision as to the type of GAM in any order, or may make the decisions in parallel.

The methods of the invention carried out by the GPEs 10, the middleware 32, the web server 34, and the end user devices 26 are preferably implemented as logical instructions in the form of software. Alternatively, any of the logical instructions may be implemented as hardware, or as a combination of software or hardware. If in the form of software, the logical instructions may be stored on a computer-readable storage medium in a form executable by a computer processor.

The words 'game' or 'sports event' or 'competition' have been used interchangeably in this document, such that they may refer to any event which involves a progress of actions or movements culminating in a conclusion, whether competitive or demonstrational, professional or amateur, human or animal. In general, an event may be a golf game, a football game, a chess game, an ice-skating demonstration, a marathon run, competitive sheep dog trials, horse racing, a cricket match, or any other event which involves movement and/or scoring and/or competition. Game play information may be viewed more generally as event information, where the event information contains information about an event, as defined above, and which may be stored in an event information file consisting of multiple simple messages which collectively describe the event in sufficient detail for a simple representation of the event to be displayed.

The embodiments presented are exemplary only and persons skilled in the art would appreciate that variations to the embodiments described above may be made without departing from the spirit of the invention.

I claim:

1. A method of generating a game play file describing an event, the method comprising:
   capturing aspects of the event using a graphic user interface;
   generating a plurality of game activity messages, each of which describes one of the captured aspects of the event; and
   assembling the plurality of game activity messages into a game play file.

2. The method of claim 1 wherein one game activity message includes a start message indicating the start of the event, one game activity message includes an end message indicating the end of the event, and a plurality of game activity messages include a position of an identified element.

3. The method of claim 1 wherein each game activity message is in an XML (eXtensible markup language) format.

4. The method of claim 1 wherein capturing aspects of the event comprises determining a position of an element from the position of a cursor on the graphical user interface, and wherein at least one of the game activity messages includes the position.

5. The method of claim 1 wherein the event is archived, wherein capturing aspects of the event comprises:
   determining a plurality of positions of an object from a first plurality of positions of a cursor of the graphical user interface; and
   determining a plurality of positions of a player from a second plurality of positions of the cursor of the graphical user interface;
   wherein each of a plurality of the game activity messages includes one of the positions, an identification of the object or of the player, and a timestamp;
   wherein the timestamp of one of the game activity messages identifying the object is earlier than the timestamp of one of the game activity messages identifying the player, and the timestamp of one of the game activity messages identifying the player is earlier than the time stamp of one of the game activity messages identifying the object; and
   wherein assembling the plurality of game activity messages into a game play file comprises adding the game activity messages to the game play file such that they are arranged chronologically.

6. The method of claim 1 wherein the event is live, wherein capturing aspects of the event comprises:
   determining a plurality of positions of an object from a first plurality of positions of a cursor of the graphical user interface at a first game play encoder; and
   determining a plurality of positions of a player from a second plurality of positions of the cursor of the graphical user interface at a second game play encoder;
   wherein each of a plurality of the game activity messages includes one of the positions, an identification of the object or of the player, and a timestamp; and
   wherein assembling the plurality of game activity messages into a game play file comprises arranging the game activity messages chronologically.

7. The method of claim 2 further comprising including in the game play file at least one game activity message which is an embellishment.

8. The method of claim 2 wherein the element is an object or a player.

9. The method of claim 7 wherein at least one of the embellishments identifies an advertisement.

10. The method of claim 7 wherein at least one of the embellishments indicates that a video clip of a portion of the event is available.

11. The method of claim 7 wherein at least one of the embellishments indicates that an important play is imminent.

12. The method of claim 4 wherein an element has a tracking chip, wherein capturing aspects of the event comprises determining a position of the element from the tracking chip, and wherein at least one of the game activity messages includes the position.

13. The method of claim 4 wherein the element is an object or a player.

14. The method of claim 5 further comprising including in the game play file at least one game activity message which is an embellishment, each embellishment identifying an advertisement, indicating that a video clip of a portion of the event is available, or indicating that an important play is imminent.

15. A method by which an end user device displays game play information, comprising:
- identifying an event to a server;
- retrieving game activity messages from the server for the event, at least some of the game activity messages including a position, a timestamp, and an identification of an element;
- displaying a representation of a field of play and at least one icon, each icon representing a different element; and
- moving the at least one icon on the representation of the field of play in accordance with the game activity messages.

16. The method of claim 15 wherein at least one game activity message is an embellishment.

17. The method of claim 15 wherein moving the at least one icon is such that the time between display of two icons representing the same element is the same as the time between the timestamps of two sequential game activity messages identifying the element.

18. The method of claim 15 wherein moving the at least one icon is such that the time between display of two icons representing the same element is reduced from the time between the timestamps of two sequential game activity messages identifying the element.

19. The method of claim 15 wherein the element is an object or a player.

20. The method of claim 15 wherein each game activity message is in an XML (eXtensible markup language) format.

21. The method of claim 16 wherein the embellishment indicates an advertisement, the method further comprising displaying the advertisement.

22. The method of claim 16 wherein the embellishment indicates that a video clip of a portion of the event is available, and wherein the method further comprises:
- upon receipt of such an embellishment, allowing the video clip to be displayed; and
- upon selection of display of the video clip, displaying the video clip.

23. The method of claim 16 wherein the embellishment indicates that an important play within the event is imminent, and wherein the method further comprises displaying a different colour for a duration of time.

* * * * *